Aug. 28, 1956  J. E. HERRICK ET AL  2,761,046
AUTOMATIC ARC WELDING VIEWING MECHANISM
Filed Feb. 16, 1953  2 Sheets-Sheet 1
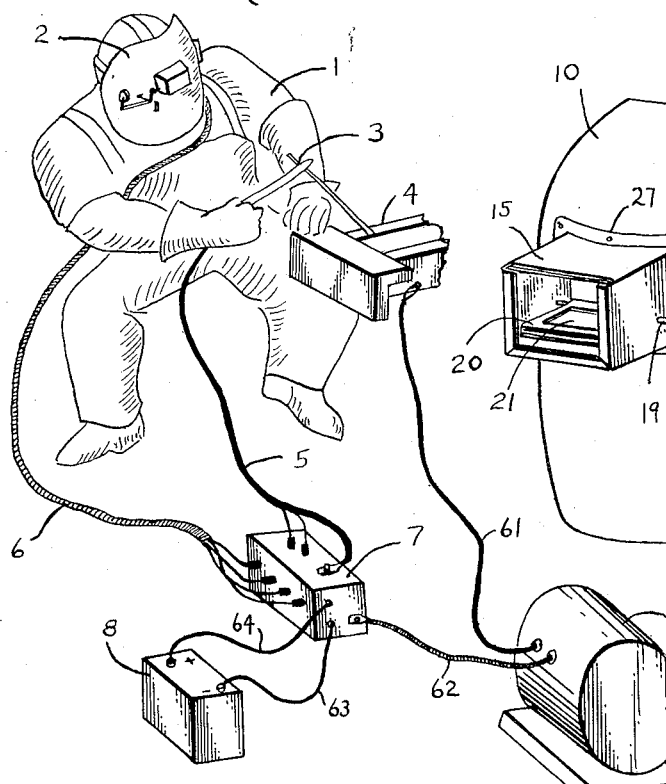
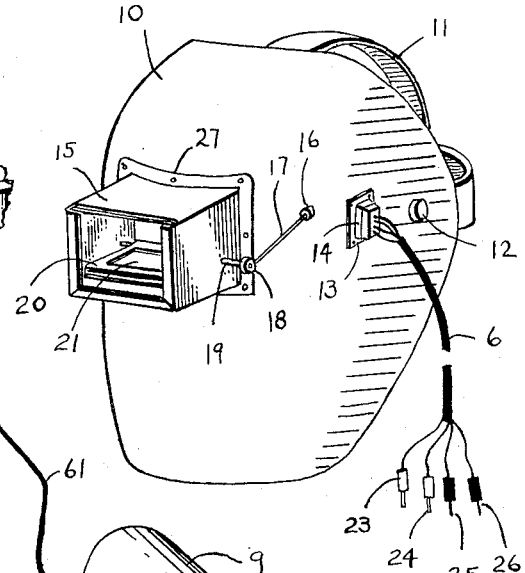
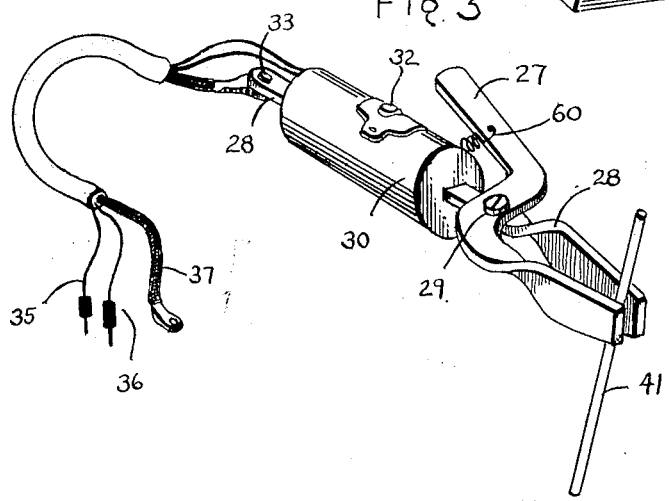
INVENTOR
JAMES ELDER HERRICK
WILLIAM WILSON HERRICK

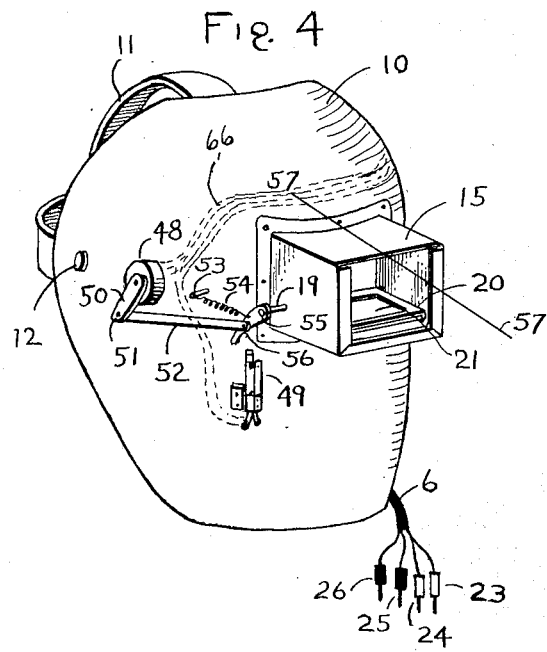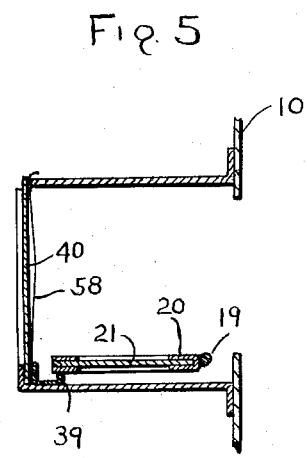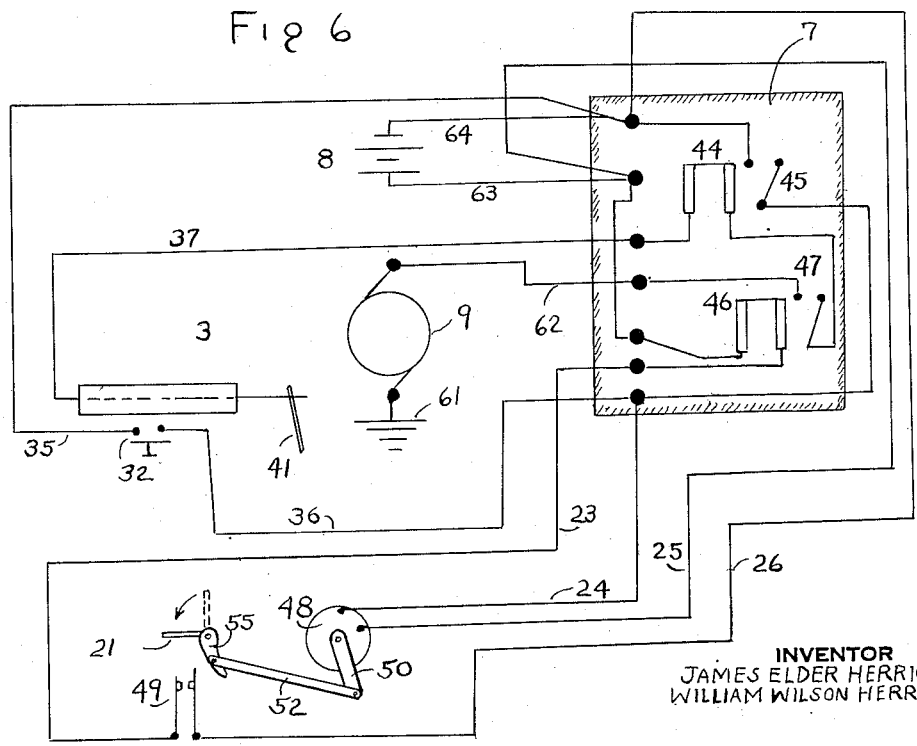

United States Patent Office 2,761,046
Patented Aug. 28, 1956

2,761,046

AUTOMATIC ARC WELDING VIEWING MECHANISM

James Elder Herrick and William Wilson Herrick, Stamford, Conn.

Application February 16, 1953, Serial No. 336,948

4 Claims. (Cl. 219—8)

This invention relates to an improvement in electric arc welding and specifically involves automatic control of the dark glass in the welder's mask.

More particularly, this invention relates to that type of construction in which a dark glass is moved automatically into position relatively to a welder's mask to protect the eyes of the welder against injury from an electric arc. In prior art structures of the particular class, it is customary to place a control switch in the welding circuit, and to maintain this switch in open condition until the glass is moved into protecting position relatively to the mask. Thus, when the glass moves into a particular protecting position, it effects the closing of the welding circuit at a particular point, and thereafter the welding operation may be carried on.

It is important, however, to effect the opening of the welding circuit and the cessation of the arc prior to the movement of the glass out of protecting relation relatively to the welder's mask. A number of suggestions have been made for obtaining this effect, but insofar as we know, none of these suggestions has been practical or effective. It is one of the purposes of our invention to compel the opening of the welding circuit, and the cessation of the arc, prior to the movement of the protective dark glass away from its effective protecting position. Thus, as a feature of our invention, the welding circuit, when closed, effects the maintenance of the protective glass in protecting position.

As a further feature of our invention, we effect the movement of the protective glass to protecting position through manual means preferably positioned at the welder's torch. Means are provided once the welding circuit is closed, to maintain the glass in protecting position even though the manual means are released. This means that once the protective glass is in position and the welding circuit is closed, the operator need do nothing further to hold the glass in protecting position, his hands being free at all times to perform the welding operation. The glass will not move out of protective position until after the welding circuit is broken.

As still a further feature of this invention, the welding circuit cannot be broken, once it is made, except at the welding rod itself. Therefore, there will be no severe arcing at a switch, all as will be appreciated by those skilled in this art.

As a further feature of our invention, we contribute an entire operating combination that is extremely effective and simple, this operating combination including manual means for effecting the movement of the protective glass into protecting position whereupon it becomes possible thereafter to close the welding circuit, the closing of the welding circuit in turn holding the protective glass in protecting position regardless of the manual means, the protective glass moving thereafter only out of protecting position upon the opening of the welding circuit. Even then, the protective glass will not move out of protecting position unless the manual means are operated in a particular manner.

As a further feature of our invention, we prefer to utilize a separate circuit for the control of the operation of the protective glass. In addition, we prefer to use positive means for moving the protective glass into protecting position, but those skilled in the art will appreciate that various types of control means may be arranged, and that actually the protective glass may otherwise be moved into and out of protecting position.

We have thus outlined rather broadly the more important features of our invention in order that the detailed description thereof that follows may be better understood, and in order that our contribution to the art may be better appreciated. There are, of course, additional features of our invention that will be described hereinafter and which will form the subject of the claims appended hereto. Those skilled in the art will appreciate that the conception on which our disclosure is based may readily be utilized as a basis for the designing of other structures for carrying out the several purposes of our invention. It is important, therefore, that the claims be regarded as including such equivalent constructions as do not depart from the spirit and scope of our invention, in order to prevent the appropriation of our invention by those skilled in the art.

Referring now to the drawings, Fig. 1 is a general view showing the utilization of the invention in welding.

Fig. 2 is a general perspective view showing the helmet used in connection with my invention.

Fig. 3 is a perspective view of parts of the invention, including the manually operated switch and the welding rod.

Fig. 4 is a perspective view of the welder's helmet taken on the side opposite that of Fig. 2.

Fig. 5 is a section taken along line 57—57 of Fig. 4.

Fig. 6 is a wiring diagram.

Figure 1 portrays a general overall picture of a welding operation showing an operator 1 wearing a helmet 2 holding an electrode holder 3 and processing a weldment 4. Master control box 7 is powered by low voltage current source 8 through wires 64 and 63. A four conductor wire 6 connects mask 2 with master control box 7. A three conductor wire connects electrode holder 3 with master control box 7. Item 61 is the ground wire to the weldment 4 from welding current supply 9 and which may be either A. C. or D. C. current.

Figure 2 illustrates the left hand side of a conventional welding helmet wherein 10 generally indicates the face shield portion fitted with head bands 11 and hinge pivoted by means of two pins 12 positioned on opposite sides of the helmet. This helmet is fitted out with the new automatically controlled dark lens mechanism. Item 15 is a special box type housing secured to the helmet by means of rivets 27. Shaft 19 extends through box 15 by means of two holes and forms the axis of rotation of dark glass 21 supported in a frame 20 and described in greater detail in Figure 4. The shaft 19 extension passes through the exterior of box housing 15 and is fitted with a small cylindrical hub 18 and carries a counterbalance arm 17 fitted with a small weight 16 at its other extremity which counterbalances the off-center rotational effect of dark glass 21 and its supporting frame 20. Figure 4 illustrates the right hand side view of the welding helmet and shows dark glass shaft 19 extending through the sides of housing 15 and fitted with a bell crank arm 55. This arm is connected to solenoid arm 50 by means of link 52 and pins 51 and 56. Arm 50 is pressed onto the shaft extension of rotary solenoid 48. When the armature of rotary solenoid 48 rotates, motion is transmitted to the dark glass 21. The tip end of arm 55 is placed in line with a normally open electric contact switch 49 so that when the dark lens 21 is rotated to the dark viewing or vertical position, the contacts of 49 are closed. These contacts control the welding current circuit further described in Figure 6.

Item 14, Figure 2 is a four conductor jack plug receptacle, which is secured by means of rivets 13 to helmet 10. Wire endings 23, 24, 25 and 26 represent jack plugs to attach to master control box 7 Figure 1. The dotted lines, item 66 Figure 4 represent the continuation of four conductor wire 6 to rotary solenoid 48 and contact points 49. Crank arm 55 Figure 4 is fitted with a tension spring 54 terminating at spring stud 53 riveted in the shield portion of helmet 10; its purpose is to maintain dark glass 21 and rotary solenoid 48 in an open position when no current is flowing in the welding circuit; this permits the welder unobstructed vision of the work. Figure 5 is a section from line 57 of Figure 4 and is a sectional view of the dark glass mounting and housing. Item 10 is a section of the helmet. 20 is the mounting frame for dark glass 21. Item 19 is the shaft to which mounting frame 20 is secured and soldered. 40 is a clear glass slidably positioned between the right angular bend of the housing 15 and channel 39 which is soldered to the two vertical sides and bottom of the housing but absent at the top and permitting the entrance of the glass. The purpose of glass 40 is to prevent weldment spatter and sparks from damaging the dark lens 21 and injury to operator's eyes when the dark lens is in an open position.

Figure 6 is a diagram of the electrical circuit, the study of which further explains the sequence of operation. In starting a weldment, the operator touches the grounded weldment 61 with electrode 41. The dark glass 21 in the helmet remains open until cycle button contact 32 is pressed, at which time electricity from current source 8 flows through cable 64, master control box 7, cable 35, cycle switch 32, cable 36, master control box 7, cable 24 and mask rotary solenoid 48, completing the electric circuit to current source 8 by way of cable 25, master control box 7 and cable 63.

This completion of the electrical circuit through rotary solenoid 48 results in the solenoid moving arm 50, link 52, and as a result, dark glass 21 is lifted on its hinge pin 19 so as to instantly close off the welder's vision by vertical positioning.

At the final closing point of dark glass 21, lever 55 closes electric contact points 49 and as a result, electricity flows from current source 8, through cable 63, master control box 7, relay 46, cable 23, contact points 49, cable 26, master control box 7, and completes the circuit to current source 8, through cable 64. As this circuit energizes welding current relay 46, contact 47 is closed, and an arc can then be drawn by the separation of the electrode 41 from the grounded weldment 61. The purpose of relay 44 is to automatically maintain the dark glass 21 in its protective position as long as welding current is being used. The use of welding current closes contact points 45 of relay 44 and as a result, current flows from source 8 through cable 64, master control box 7, contact points 45, cable 24, rotary solenoid 48, cable 25, master control box 7 and cable 63, thereby completing the electric circuit to current source 8. This holds closed the circuit of solenoid 48 independently of manually operated cycle switch 32 as long as the welding arc is maintained and relay 44 remains energized.

From this description, it will be apparent that no welding current can flow unless the dark glass is in its vertical protective position; similarly, no welding current can flow unless the operator starts the sequence of events by pressing the cycle button 32. This prevents the operator from making a mistake and blinding himself, as well as preventing accidental arcs.

Finally, when the weldment is completed, it will be noted that this must be done by withdrawing the arc from the work, and consequently, no injury or burning is caused to the contact points 47 or relay 46 as the arc itself, being extinguished, acts as the welding current switch.

Further, only upon the extinguishing of the arc will the circuit of rotary solenoid 48 be opened to bring the dark glass away from protective position. From the foregoing, it will be seen that the principles, together with the mechanical elements and their arrangement, establish a means for greatly improving the art of practical arc welding, and accordingly, it is not intended to limit the invention to the exact construction shown and described, but all suitable modifications and equivalents may be resorted to falling within the scope of the appended claims.

What is claimed is:

1. In a combination of the class described, a welder's mask having thereon an eye shield and an electromotive means for moving said eye shield to closed position upon the excitation of the said electromotive means, an actuating circuit for said electromotive means including a source of current, a welding torch for holding a welder's electrode, a manually operated switch for said actuating circuit carried by said torch, a shorting switch in shunt relation to said manually operated switch, the closing of either of said switches effecting the excitation of said electromotive means through the closing of its actuating circuit, a relay for closing said shorting switch, a welding circuit including said electrode and said relay and a control switch, and means whereby said control switch is maintained open until said eye shield moves to closed position.

2. In a combination of the class described, a welder's mask having thereon an eye shield and an electromotive means for moving said eye shield to closed position upon the excitation of the said electromotive means, a circuit for said electromotive means including a source of current, a welding torch for holding a welder's electrode, a manually operated switch for said circuit carried by said torch, a second switch in shunt relation to said manually operated switch, the closing of either of said switches effecting the excitation of said electromotive means through the closing of its circuit, a relay for operating said second switch, and a welding circuit including said electrode and said relay.

3. In a combination of the class described, a welder's mask having thereon an eye shield and an electromotive means for moving said eye shield to closed position upon the excitation of the said electromotive means, a circuit for said electromotive means including a source of current, a manually operated switch for closing said circuit, a welding circuit, means controlled by the closing of said eye shield is a prerequisite to the closing of said welding circuit, and means whereby said circuit for said electromotive means is closed independently of said manually operated switch when said welding circuit is closed.

4. In a combination of the class described, a welder's mask having thereon an eye shield and an electromotive means for moving said eye shield to closed position upon the excitation of the said electromotive means, an actuating circuit for said electromotive means including a source of current, a welding torch for holding a welder's electrode, a manually operated switch for said actuating circuit carried by said torch, a shorting switch in shunt relation to said manually operated switch, the closing of either of said switches effecting the excitation of said electromotive means through the closing of its actuating circuit, a relay for closing said second switch, a welding circuit including said electrode and said relay and a control switch, means whereby said control switch is closed when said eye shield moves to closed position whereupon said welding circuit is closed through said electrode, said relay and said control switch and can be broken thereafter only at said electrode.

References Cited in the file of this patent

UNITED STATES PATENTS

| | | |
|---|---|---|
| 2,384,517 | Zimmerman | Sept. 11, 1945 |
| 2,471,719 | Broffitt | May 31, 1949 |
| 2,582,860 | Clerke | Jan. 15, 1952 |